Aug. 14, 1928. 1,680,747
C. F. RANDOLPH ET AL
TOOL FEEDING AND CLAMPING MECHANISM FOR PLANERS
Filed Nov. 16, 1923 4 Sheets-Sheet 1

INVENTORS
C. F. Randolph
R. H. Rausch
N. Marcalus
BY
ATTORNEY

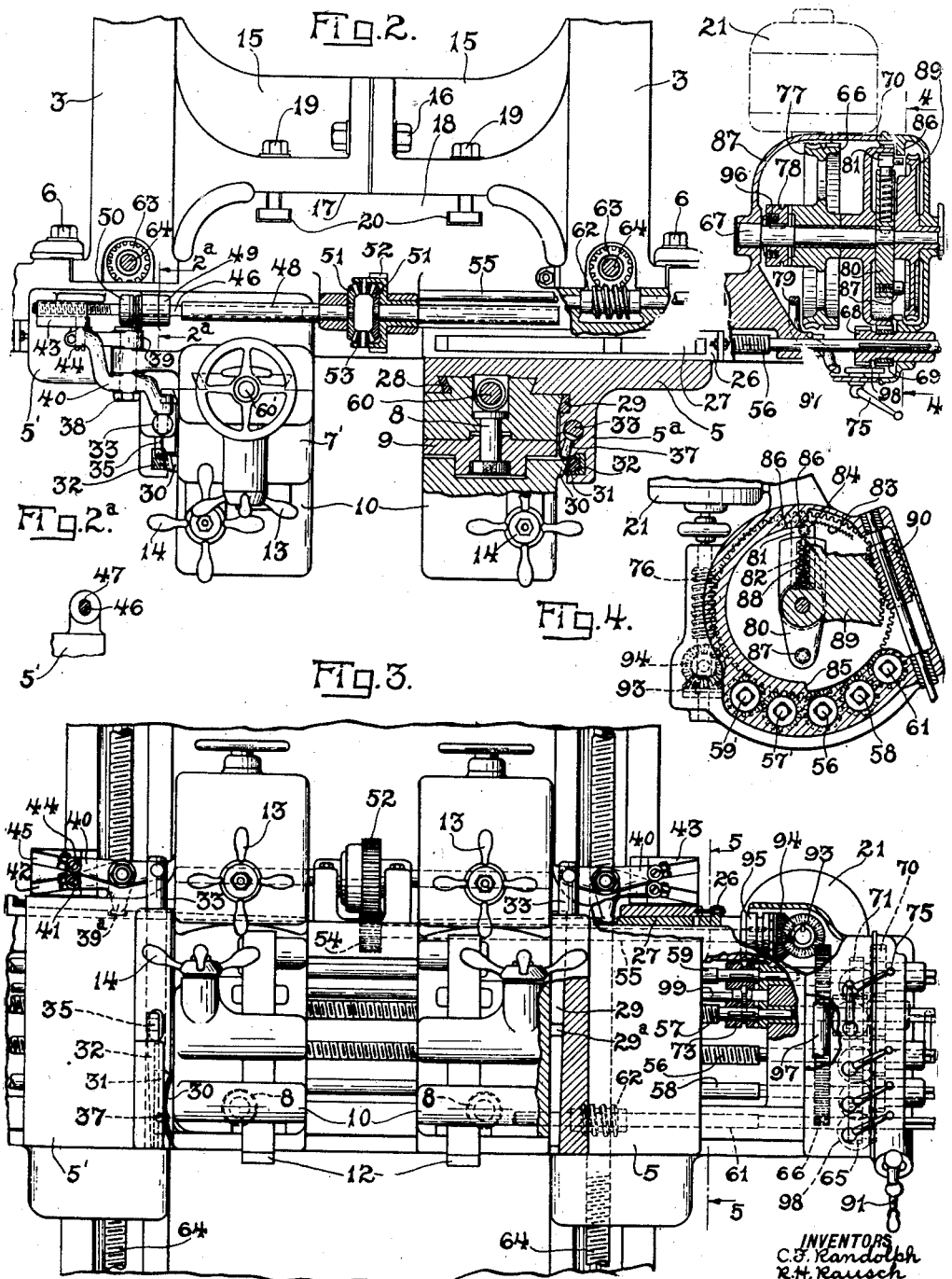

Aug. 14, 1928.
C. F. RANDOLPH ET AL
1,680,747
TOOL FEEDING AND CLAMPING MECHANISM FOR PLANERS
Filed Nov. 16, 1923  4 Sheets-Sheet 3
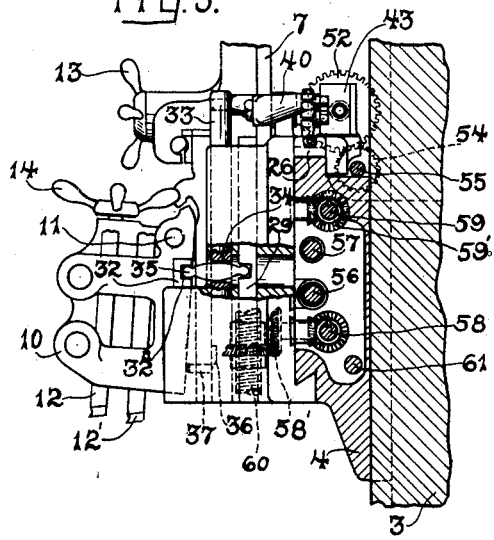
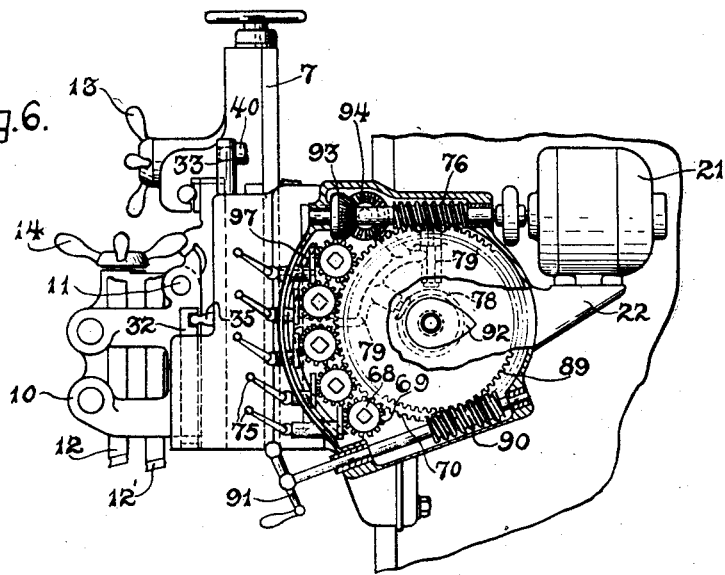
INVENTORS
C. F. Randolph
R. H. Rausch
N. Marcalus
BY
Laurie Witter
ATTORNEY

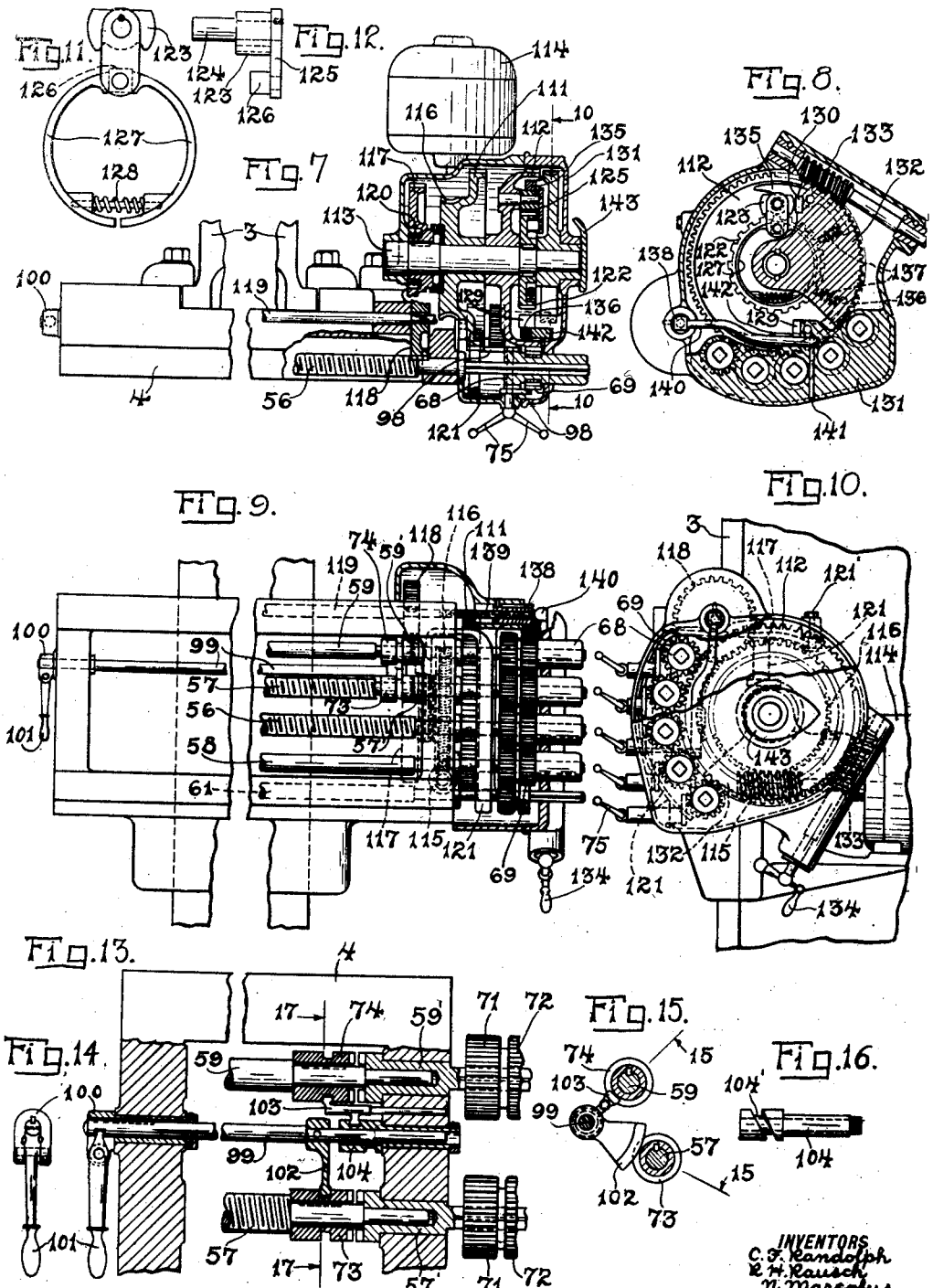

Patented Aug. 14, 1928.

1,680,747

UNITED STATES PATENT OFFICE.

CLIFFORD F. RANDOLPH, ROSWELL H. RAUSCH, AND NICHOLAS MARCALUS, OF PLAINFIELD, NEW JERSEY, ASSIGNORS TO NILES-BEMENT-POND COMPANY, OF NEW YORK, N. Y., A CORPORATION OF NEW JERSEY.

TOOL FEEDING AND CLAMPING MECHANISM FOR PLANERS.

Application filed November 16, 1923. Serial No. 675,203.

This invention relates to planers and like machines and more particularly to means for securing or clamping the tool supporting elements thereof rigidly to their supports during the cutting operation, thereby preventing vibration and providing a smooth and accurate cut. The planer illustrated in the accompanying drawings is constructed particularly for the planing of frogs and switches of railway rails. Such work requires very heavy cutting operations and the machine must of course be constructed accordingly. Furthermore, these heavy cuts subject the tools to extremely heavy strains and vibrations and make the rigid supporting of the tools essential.

In planers as ordinarily constructed, each tool is held in a tool holder supported on a tool slide vertically movable in a saddle slidable on the cross rail of the planer. Each of these elements is fitted to its supporting element as accurately as possible in order to avoid vibration therebetween. It is obvious that this fitting cannot be sufficiently accurate to prevent all tool vibration and such vibration and looseness will of course become greater as the machine is operated over a long period of time. It is the primary object of this invention to provide novel means for rigidly securing each of the said tool supporting elements to its support during the cutting operation. It will be understood that one or more of such elements are progressively moved between the successive cutting operations to provide tool feed. The securing or clamping mechanism comprising the invention is so operated that the tool supporting elements are automatically released at the end of each cutting operation to permit the said feeding movement and are securely clamped after each feeding operation and prior to the next cutting operation.

In accordance with the invention as shown in the accompanying drawings, a pair of tool supporting saddles are slidably mounted on the cross rail of the planer and a sliding taper gib is provided in connection with each saddle for securing the same rigidly to the rail. Power means are provided for sliding these gibs with balanced or equal forces to secure the saddles to the rail prior to each cutting operation and to release the same after the cutting operation and prior to the feeding operation. It is an object of the invention to provide a mechanism for performing these functions as stated.

Slidably mounted in each saddle is a tool slide which swivelly supports a block to which is pivoted a tool holder. Clamping means including a taper gib is provided in connection with each slide and another taper gib in connection with each pivoted tool holder. These gibs are preferably operated from the same means which operates the saddle clamping gibs and are operated in the same timed relation relative to the cutting and feeding operations. It is another object of the invention to provide mechanism for performing these clamping functions.

While as illustrated and described herein, means are provided for simultaneously clamping the tool saddles, slides and holders, it will be understood that the invention contemplates the performing of these operations either singly or collectively in any combination desired. It will furthermore be noted that the clamping of the said tool holder is accomplished irrespective of the angular position to which the said tool holder block may be adjusted.

Another object of the invention is to provide means in connection with the above described clamping means for positively pivoting the tool holder outwardly at the end of each cutting operation whereby marring of the work by the tool during the return or non-cutting stroke of the work table is prevented.

Another object of the invention is to provide an improved tool feeding means for the tool supports, such means preferably also being adapted to perform the clamping and unclamping operations and the tool holder pivoting operation as illustrated in the accompanying drawings.

As illustrated in the accompanying drawings, two tool supporting saddles are slidably mounted on the cross rail. Ordinarily the power feeding and traversing of these saddles and the slides therein can be controlled only from the end of the rail at the front side of the machine. The operator frequently has occasion, however, to control the rear saddle and slide from the rear side of the machine. It is another object of this invention to provide means in connection with the feeding and traversing means for so controlling these parts.

With the above and other objects in view, our invention consists in the features of construction and operation set forth in the following specification and illustrated in the accompanying drawings. In such drawings annexed hereto and forming a part of this specification, we have shown certain embodiments of our invention in a planer but it will be understood that the invention can be otherwise embodied and that the drawings are not to be construed as defining or limiting the scope of the invention, the claims appended to this specification being relied upon for that purpose.

Referring to the figures of the drawings:

Fig. 2 is a fragmentary plan view thereof showing the mechanism for feeding and clamping the various tool supports, certain portions thereof being shown in horizontal section.

Figure 1:
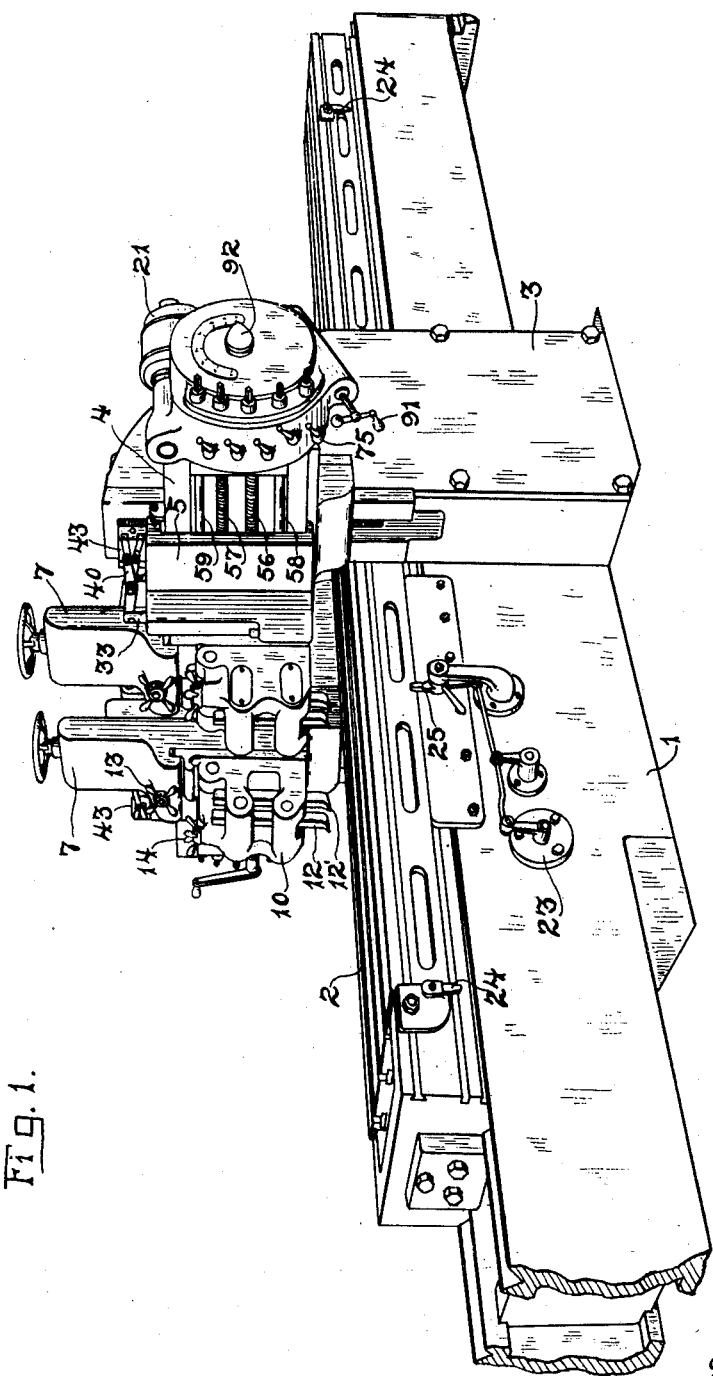
Figure 1 is a perspective view of a planer embodying our invention.

Fig. 2$^a$ is a detail view taken on line 2$^a$—2$^a$ of Fig. 2.

Fig. 3 is a front elevation of Fig. 2, partially in section.

Fig. 4 is a view taken approximately on line 4—4 of Fig. 2.

Fig. 5 is a fragmentary view taken approximately on the line 5—5 of Fig. 3.

Fig. 6 is a front end elevation of the cross rail, the cover being broken away.

Fig. 7 is a fragmentary plan view, partially in section showing another modification of our invention.

Fig. 8 is a view taken approximately on line 10—10 of Fig. 7.

Fig. 9 is a front elevation of the mechanism shown in Fig. 7.

Fig. 10 is an end elevation thereof, the cover being removed.

Fig. 11 is an enlarged face view of a detail illustrated in Fig. 8.

Fig. 12 is a side elevation of a portion of Fig. 11.

Fig. 13 is a fragmentary view of certain clutch shifting mechanism, the section being taken on line 15—15 of Fig. 15.

Fig. 14 is an end view of a part shown in Fig. 13.

Fig. 15 is a sectional view taken on line 15—15 of Fig. 13.

Fig. 16 is a detail view of a clutch shifting cam.

In the drawings 1 indicates the bed of a planer having a work table 2 slidably mounted thereon and a pair of uprights 3 respectively at opposite sides of the table. A cross rail 4 is mounted to slide vertically on the uprights and is adapted to slidably support a pair of tool head saddles 5 and 5' thereon. Bolts 6 threaded into the rail are adapted to clamp the rail to the uprights. Tool slides 7 and 7' are mounted for vertical movement in the saddles 5 and 5' in the usual manner. Swivelly mounted on a center pin 8 on each tool slide is a block 9 (see Fig. 2) and a tool holder 10 pivoted to the block at 11 (see Fig. 5) is adapted to support a pair of tools 12 and 12' therein. Means operated by a hand wheel 13 is adapted to angularly adjust each block 9 about its pivot 8 and to securely clamp the block in its adjusted position. Other means operated by a hand wheel 14 is adapted to secure the tools 12 and 12' in the tool holder 10.

For the purpose of securing rigidity, the uprights 3 are preferably connected together and to the cross rail 4 in the manner shown in Fig. 2. The two uprights are provided with inwardly projecting integral portions 15 secured together by bolts 16. The forward faces of these portions 15 are finished off at 17 to receive the cooperating face of a rearwardly extending portion 18 of the cross rail, such portion 18 also preferably being integral with the rail. Bolts 19 in the portions 15 extend into T-slots 20 in the cross rail whereby the cross rail and uprights can be securely clamped together at 17. The entire intermediate portion of the cross rail over the table is therefore rigidly backed up by the two uprights in a manner to securely hold the same against vibration during the cutting operations.

The table 2 is adapted to be reciprocated from a main motor (not illustrated). A motor 21 is mounted on a rearwardly extending bracket 22 on the cross rail and, as illustrated in the drawings, this motor is adapted to feed and traverse the tool saddles and slides and to move the cross rail on the uprights. The main motor and the motor 21 are automatically controlled by a pilot switch 23 operated by table dogs 24 engaging a switch arm 25. This mechanism and its operation are more fully disclosed in Patent No. 1,299,192. The specific tool feeding and traversing mechanism illustrated in the drawings and operated from the motor 21 is hereinafter described.

Each saddle 5 and 5' is accurately fitted to a dove-tail projection on the cross rail by means of an adjustable taper gib 26. This gib is recessed to receive therein a second taper gib 27 hereinafter described as the clamping gib. Each tool slide 7 and 7' is accurately fitted within its saddle guideway by means of a taper gib 28. A second taper gib 29 is provided for securing or clamping the slide against vibration in the saddle. It will be noted that these clamping gibs are tapered only on their rear faces whereby sliding movement of the saddles and slides have no clamping effect thereon. The mechanism for operating the clamping gibs is hereinafter described.

The outer edge of each tool holder 10 is provided with an integral projection 30 thereon. This projection is tapered rearwardly and shaped arcuately about the center 8 as an axis (Fig. 3). Cooperating with the projection 30 is an arcuate clamping block 31 slidably supported in a guideway in the forward face of a taper gib 32. This gib is slidably mounted in a forwardly projecting portion 5ª of the saddle (Fig. 2) and the rear face only of the gib is tapered. The block 31 is therefore free to move vertically with the tool holder without in any way effecting the clamping operation.

Vertically slidable in the portion 5ª of each saddle is a rod 33. This rod is recessed at 34 for receiving a cross bar 35 loosely therein. The ends of the cross bar extend respectively into recesses 29ª and 32ª in the gibs 29 and 32. The lower end of the rod 33 is recessed at 36 and the lower wall of such recess is inclined. A pin 37 is freely slidable in a bore in the saddle portion 5ª in a manner to engage the projection 30 of the pivoted tool holder. Movement of the rod 33 upwardly is adapted to withdraw the gibs 29 and 32 to release the slide and tool holder and to force the pin 37 outwardly to pivot the tool holder away from the block 9 (Fig. 5). Movement of the rod downwardly permits the pin 37 to enter the recess 36 and seats the gibs 29 and 32 with balanced pressures to securely clamp the tool slide 7 and tool holder 10 rigidly in fixed cutting position.

As illustrated in Figs. 1 to 5, a pair of levers 39 and 40 are pivotally mounted on a bolt 38 on each saddle. The lever 39 is a bell crank and the downwardly extending arm 39ª thereof engages in a notch in the gib 27. The other end of this lever carries a pin 41 which engages in a groove 42 in the forward face of a block 43. The inner end of the lever 40 is pivotally connected to the rod 33 and the outer end thereof carries a pin 44 which engages in a second and relatively angular groove 45 on the block 43. The block 43 is screw threaded to the outer end of a shaft 46. This shaft is rotatably supported in a bearing 47 and the inner end thereof is telescopically splined within a tubular shaft 48. The bearing 47 is elliptical in shape (Fig. 2ª), to permit the shaft and block 43 a slight floating movement vertically whereby the levers 39 and 40 are operated with equal forces. The shaft is held against axial movement in the bearing by means of a pair of collars 49 and 50.

It will be understood that a shaft 48 and its cooperating mechanism as just described are provided on and adjacent each saddle 5 and 5'. Each shaft 48 is keyed to a bevel gear 51 of a differential gearing (Fig. 2). This gearing comprises a conventional differential driving gear 52 carrying a plurality of bevel pinions 53 in mesh with the bevel gears 51. As illustrated, this mechanism is driven by a gear 54 on a shaft 55.

Screws 56 and 57 rotatably mounted in the cross rail 4 are respectively threadedly connected to the front and rear saddles 5 and 5' and a pair of parallel shafts 58 and 59 are respectively connected by bevel gears 58' and 59' to the tool slide screws 60 and 60'. Another shaft 61 is provided with worms 62 thereon meshing with worm wheel teeth on nuts 63 threaded to the rail supporting screws 64. Rotation of the shaft 61 is therefore adapted to lower or elevate the cross rail.

A pinion 65 splined to the shaft 61 is adapted to mesh with a gear 66 loose on a shaft 67 parallel with the shaft 61. A pinion 68 provided with a ratchet pinion 69 is splined to each screw 56 and shaft 58. These pinions 68 and 69 are respectively adapted to be meshed with the gear 66 and a second gear 70 also loose on the shaft 67. A like pair of pinions 71 and 72 (see Fig. 13) are splined to extended portions 57' and 59' of the screw 57 and shaft 59. These extended portions can be operatively connected to their respective shafts by means of clutches 73 and 74 as hereinafter described. An operating handle 75 is provided for shifting each pair of pinions and the pinion 65. The gear 66 is herein termed the "traversing gear" since the cross rail and tool supports are traversed thereby and the gear 70 is termed the "feedgear" since the tool supports are fed thereby. The armature shaft of motor 21 carries a worm 76 in mesh with a worm gear 77 preferably integral with the gear 66. The shaft 67 can be connected to the gear 66 by means of a clutch 78 shifted by means of a yoke 79 as hereinafter described.

Keyed to the shaft 67 within the feed gear 70 is an element 80. A toothed pawl 81 within the element is normally pressed outwardly by a spring 82 into engagement with teeth 83 in the gear 70. The pawl carries a lug 84 adapted to engage with a shoulder 85 and a cam 86 on the frame 87. The shoulder 85 limits the rotation of the element in a clockwise direction (Fig. 4) and the cam 86 withdraws the pawl from the teeth 83 when the element is rotated in the anti-clockwise direction.

The element 80 carries a pin 87 adapted to engage against a shoulder 88 on a worm gear 89 loose on the shaft 67. The worm gear can be rotatably adjusted by means of a worm 90 having an operating handle 91. The clockwise rotation of the element 80 can be limited as desired by adjusting the worm gear 89. With the worm gear adjusted to the position shown in Fig. 4, the feed gear 70 will be rotated with the element 80 through the maximum feeding distance, namely, between the shoulder 85 and cam 86. The disengaging point (cam 86) of the pawl is fixed and by limiting the clockwise rotation of the element 80, the oscillatory movement of the feed gear 70 is limited. The adjustment of the worm gear 89 can be accurately observed from an indicator 92 exterior of the box 87.

A bevel gear 93 on the motor shaft is in mesh with a bevel gear 94 loose on the shaft 55. A clutch 95 is adapted to operatively connect the gear 94 to the shaft 55. As illustrated in Fig. 6, the yoke 79 is pivoted at 79' and is operatively connected to both clutches 78 and 95. A spring 96 is normally operative to actuate both these clutches. The yoke has a forward vertically extending portion 97 adapted to be engaged by cams or eccentrics 98 on the shifters 75. The connection is such that whenever any pinion is engaged with the traversing gear 66, the corresponding eccentric 98 operates to disengage clutches 78 and 95.

As shown in detail in Fig. 13, the rear tool head saddle screw 57 and the rear tool slide shaft 59 can be engaged and disengaged relative to the feeding and traversing mechanism by means of clutches 73 and 74. A rod 99 extends through the cross rail to the rear end thereof. A bushing 100 keyed to the end of the rod pivotally supports a handle 101 therein with the end of the handle engaging within a notch in the rod. By moving the handle on its pivot, the rod is moved longitudinally and operates through a yoke 102 to shift the clutch 73. A clutch shifter 103 engages the clutch 74 and also engages in a cam groove 104' in a rotary element 104 keyed to the rod 99. Rotation of the rod and element operates through the cam to shift the clutch 74. It will be noted that while the clutches are shifted by a single handle 101, such operations are entirely independent one of the other. By this mechanism the operator can control the feeding and traversing of the rear saddle 5' and slide 7' from the rear side of the machine.

The before mentioned Patent No. 1,299,192 discloses a planer having a main work table reciprocating motor and a tool feeding and traversing motor. A pilot switch operated by table dogs is adapted to automatically control both motors whereby the main motor reciprocates the table and the feed motor is reversely rotated at each reversal of the table. The feed motor can also be manually controlled and rotated continuously in either direction for traversing the tool supports. Reference to such patent should be made for such features which are not illustrated herein and which do not of themselves comprise a part of this invention.

When it is desired to move the cross rail 4 on the uprights 3, the pinion 65 is engaged with the traversing gear 66. Rotation of the handle 75 to engage such pinion operates through the eccentric 98 and the yoke 79 to disengage the clutches 78 and 95. Rotation of the motor 21 in one direction or the other will thereupon adjust the cross rail vertically as desired. The saddles 5 and 5' and slides 7 and 7' can be likewise traversed by engaging the pinions 68 and 71 with the traversing gear 66.

The automatic tool feeding and clamping operation is as follows: Before beginning the cutting operation, the ratchet pinions 69 and 72 which it is desired to operate are engaged with the feed gear 70 and the worm gear 89 is adjusted to provide the proper amount of movement to the feed gear. It is assumed that the work table has completed a cutting stroke and has just started back in the non-cutting direction. The pilot switch has reversed the main motor and has connected the feed motor to operate in a direction rotating the element 80 clockwise (Fig. 4). The first movement of the feed motor rotates the shaft 55 in a direction to move the threaded blocks 43 outwardly which operation withdraws the clamping gibs 27 and raises the rods 33. Such movement of the rods withdraws the clamping gibs 29 and 32 and pivots the tool holder 10 outwardly by means of the inclined surfaces of the recesses 36 engaging the pins 37 (Fig. 5). The lug 84 of the pawl 81 thereafter rides off the cam 86 and permits engagement of the pawl with the teeth 83 of the feed gear 70. The feed gear is now rotated with the element 80 until the pin 87 engages against the shoulder 88. Such engagement functions to stall further rotation of the feed gear, element 80 and motor. It shoud be understood that the motor in this mechanism is operated as a torque motor, that is, in a manner permitting it to be suddenly stopped with its current on without injury to itself.

When the table reaches the end of its non-cutting stroke and is reversed, the feed motor is energized to operate in a direction to rotate the element 80 anti-clockwise (Fig. 4). The feed gear 70 is rotated with the element until the pawl 81 is withdrawn by the cam 86. The motor thereafter continues to rotate until the same is stalled by the seating of the clamping gibs 27, 29 and 32, the lug 84 of the pawl 81 riding on the concentric portion 86' of the cam 86 during this continued rotation. Such rotation of the motor moves the blocks 43 inwardly. This operation rotates the levers 39 and 40 respectively in directions to force the gibs 27 inwardly to secure the saddles to the cross rail and the rods 33 downwardly. This movement of the rods permits the tool holders 10 to swing back into cutting position and forces the gibs 29 and 32 to their clamping positions. The cross bar 35 is so mounted that the gibs 29 and 32 are moved with balanced equal forces. It should be particularly noted that movement of the saddles 5 and 5' on the cross rail 4, movement of the tool slides 7 in the saddles, and movement of the tool holder blocks 9 on their centers 8 have no effect on the clamping operations, such clamping operations being effected independently of any such adjustments.

It should be understood that the tool holders 10 are clamped and unclamped while the pawl 81 is disengaged from the feed gear 70, the lug 84 riding on the concentric surface 86' of the cam 86 serving to hold the pawl so disengaged. During the balance of the rotation of the element 80, the pawl is engaged with the gear 70 and therefore carries such gear therewith. The feed gear is therefore oscillated through a definite arc at each reciprocation of the work table and the amount of such oscillation can be adjusted as desired by adjusting the worm gear 89. It will also be understood that the ratchet pinions 69 and 72 can be set to rotate their shafts in one direction or the other from the feed gear, the rotation thereof in the opposite direction being an idle movement.

In Figs. 7 to 12 of the drawings, we have shown a modified form of the tool feeding mechanism illustrated in Figs. 1 to 6. A traversing gear 111 and a feed gear 112 are loosely mounted on a shaft 113 parallel with the rail screws and shafts. The pinions 65, 68 and 71 are adapted to be meshed with the gear 111 and the ratchet pinions 69 and 72 are adapted to be meshed with the feed gear 112. The traversing gear is adapted to be rotated from a motor 114 having a worm 115 in mesh with a worm wheel 116 preferably integral with the traversing gear. A gear 117 splined to the shaft 113 is in mesh with a gear 118 on a clamping shaft 119. The shaft 119 operates the clamping mechanism in the same manner as shafts 55 and 105 heretofore described. The adjacent faces of gear 117 and worm gear 115 are provided with cooperating clutch teeth and a spring 120 normally shifts the gear 117 into clutching engagement with the gear 115. The clutch gear 117 is adapted to be automatically shifted out of engagement by means of any one of the eccentrics 98 engaging a clutch yoke 121 pivoted at 121' when any pinion 65, 68 and 71 is engaged with the traversing gear, as illustrated in Fig. 9.

Keyed to the shaft 113 within the feed gear 112 is a ratchet gear 122. A double pawl 123 pivoted to the feed gear at 124 is adapted to engage the gear 122 whereby the feed gear is rotated in opposite directions as hereinafter described. Secured to the shank 124 of the pawl is an inwardly extending arm 125 having a pin 126 seated in its inner end. The squared end of this pin fits between the ends of two friction elements 127 within the ratchet gear. A spring 128 normally holds the elements in frictional contact with the ratchet gear.

It will be understood that the motor 114 rotates alternately in opposite directions as above described in connection with the motor 21. The following means is provided for automatically disengaging the pawl 123 after a predetermined rotation in either direction and such means is adjustable whereby to vary the amount of movement imparted to the feed gear as desired. Two stops 129 and 130 are adapted to be engaged by the pawl to positively limit the movement of the feed gear. The stop 129 is on the frame 131 and the stop 130 is on a worm gear 132 loose on the shaft 113. This gear can be rotatably adjusted by means of a worm 133 engaging the worm gear and operated by a handle 134. A lever 135 is pivoted to the worm gear adjacent the stop 130 and a like lever 136 is pivoted to the frame adjacent the stop 129. One end of each of these levers is engaged by a spring 137 and the other ends thereof are cam-shaped and in the path of movement of the pawl 123. These cam-shaped ends of the levers are adapted to disengage the pawl in the manner hereinafter described.

A nut 138 slidably and non-rotatably mounted in the frame 131 is in threaded engagement with an extension 139 of the shaft 119. The outer end of this nut is adapted to engage against a lever 140 pivoted at 141. An anvil 142 on this lever is positioned to extend into the path of movement of the pawl 123 when the nut is in the inward position within the frame, the tool supports being in the clamped position at such time. Rotation of the shaft 119 to unclamp the tool supports is adapted to force the nut outwardly and to move the anvil out of the path of the pawl.

The operation of the mechanism just described is as follows: The spring 120 normally engages the gear 117 with the worm gear 116 whereby the feed shaft 113 is rotated from the motor 114, the motor rotating alternately in the opposite directions as the work table reverses. With the parts in the position shown in Fig. 8, the tool supports are in the unclamped position and the work table is moving in the non-cutting direction. When the table reverses the motor 114 will be rotated in the direction to drive the ratchet gear 122 anti-clockwise (Fig. 8). The parts shown in Fig. 11 operate immediately to rock the pawl 123 into engagement with the ratchet gear whereby the feed gear is carried therewith. The pawl thereafter engages the cam end of the lever 136 which functions to disengage the pawl from the ratchet gear. After such disengagement, the pawl abuts against the stop 129, the spring 137 compressing. After the disengagement of the pawl, the motor continues to operate the shaft 119 until the tool supports are clamped, the friction members 127 permitting rotation of the shaft 113 relative to the pawl and feed gear.

The cutting stroke of the table continues until the table is again reversed. Upon such reversal, the motor 114 is rotated in a direction to drive the ratchet gear 122 clockwise (Fig. 8). Such rotation of the ratchet gear immediately tends to engage the pawl therewith, but such engagement is prevented by the anvil 142 which overlaps the back of the pawl. Rotation of the motor drives the shaft 119 in a direction to unclamp the tool supports and to move the nut 138 outwardly. When the tool supports have become unclamped, the nut has been moved out to rock the lever 140 sufficiently to disengage the anvil from the pawl. The pawl thereupon engages the ratchet gear whereby the feed gear is carried therewith. It should be particularly noted that the feed gear is not rotated until the tool supports have been unclamped. The pawl is thereafter disengaged by the cam on the lever 135 as heretofore described. It will be understood that the movement of the feed gear can be regulated by adjusting the worm gear 132 and the amount of such adjustment can be observed by the indicator 143.

What we claim is:

1. In a metal planing machine, the combination of a support, a member thereon, means for rigidly securing the member to the support, a feed gear operatively connected to the member, power means for rotating the gear alternately in opposite directions, and operative connections whereby rotation of the power means in one direction rotates the feed gear and thereafter operates the first named means to secure the member to the support and rotation of the power means in the opopsite direction releases the member and thereafter rotates the feed gear in the opposite direction.

2. In a metal planing machine, the combination of a support, a member thereon, a feed gear operatively connected to the member, a rotary element, power means for rotating the element alternately in opposite directions, means providing a driving connection between the feed gear and element, a cam operative to disconnect the driving connection at a predetermined point of the rotation in one direction, a stop for limiting the rotation of the feed gear in the opposite direction, one of the said stops being adjustable whereby to vary the amount of rotation imparted to the feed gear, and means operated by the said power means for rigidly securing the member to the support after each feeding operation and for releasing the same therefrom prior to each feeding operation.

3. In a metal planing machine, the combination of a support, a member thereon, means for rigidly securing the member to the support, a feed gear operatively connected to the member, a rotary element, a motor for rotating the element alternately in opposite directions, means providing a driving connection between the feed gear and element, a cam operative to disconnect the driving connection at a predetermined point of the rotation in one direction, continued rotation of the motor operating on the first named means thereafter to secure the member to the support, rotation of the motor in the opposite direction being adapted to operate the first said means to release the member and thereafter rotate the feed gear in the opposite direction, a stop operative to stall the rotation of the feed gear and motor in the last mentioned direction, and means for adjusting the last named stop whereby to vary the amount of rotation imparted to the feed gear.

4. In a machine tool, the combination of a support, a member thereon, a pivoted tool holder carried by the member, means for intermittently feeding the member on its support, and means operated by the feeding means for rigidly securing the member to the support after each feeding operation and for releasing the same therefrom and pivoting the tool holder outwardly prior to each feeding operation.

5. In a machine tool, the combination of a support, a saddle slidably mounted thereon, means for intermittently feeding the saddle along the support, and means acting in timed relation to the feeding means for rigidly securing the saddle to the support after each feeding operation and for releasing the saddle therefrom prior to each feeding operation.

6. In a machine tool, the combination of a cross rail, a saddle slidably mounted thereon, means for intermittently feeding the saddle along the rail, a taper gib carried by the saddle, and means acting in timed relation to the feeding means for sliding the gib to rigidly secure the saddle to the rail after each feeding operation and for releasing the saddle therefrom prior to each feeding operation.

7. In a machine tool, the combination of a support, a saddle slidably mounted thereon, a tool slide movable in the saddle, means for intermittently feeding the slide in the saddle, and means acting in timed relation to the feeding means for rigidly securing the slide in the saddle after each feeding operation and for releasing the slide therefrom prior to each feding operation.

8. In a machine tool, the combination of a cross rail, a saddle slidably mounted thereon, a tool supporting element carried by the saddle, a taper gib, and means for sliding the gib to rigidly secure the said element to the saddle in cutting position prior to each cutting operation and for releasing the same after such operation.

9. In a machine tool, the combination of a support, a saddle slidably mounted thereon, a slide movable in the saddle, a tool holder pivotally mounted on the slide, and means for rigidly securing the tool holder to the saddle in cutting position prior to each cutting operation and for releasing the same after such operation.

10. In a machine tool, the combination of a cross rail, a saddle slidably mounted thereon, a slide movable in the saddle, a tool supporting block carried by the slide and adapted to be moved about a fixed axis, means for moving the block about the said axis after each cutting operation, and means acting in timed relation therewith for clamping the block to the saddle in cutting position prior to each cutting operation and for releasing the same after such operation.

11. In a machine tool, the combination of a cross rail, a saddle slidably mounted thereon, a slide movable in the saddle, a block swivelly mounted on the slide and adapted to be rotatably adjusted about its swivel axis, a tool holder pivotally mounted on the block, and means for clamping the tool holder to the saddle in cutting position prior to a cutting operation and for releasing the same after such operation, the last named means being operative with the block in various positions of adjustment about the swivel axis.

12. In a machine tool, the combination of a support, a saddle slidably mounted thereon, a slide movable in the saddle, a tool holder pivotally mounted on the slide, means for pivoting the tool holder outwardly at the end of each cutting operation, and means acting in conjunction with the last named means for clamping the tool holder to the saddle in cutting position prior to each cutting operation and for releasing the same after such operation.

13. In a machine tool, the combination of a support, a saddle slidably mounted thereon, a slide movable in the saddle, a tool holder pivotally mounted on the slide, a slidably mounted rod in said supporting member, means operated by the rod for pivoting the tool holder outwardly at the end of each cutting operation, means operated by the rod for clamping the tool holder to the saddle in cutting position prior to each cutting operation and for releasing the same after such operation, and means for operating the rod in timed relation to the cutting operations.

14. In a machine tool, the combination of a support, a saddle slidably mounted thereon, a slide movable in the saddle, a tool holder pivotally mounted on the slide, a longitudinally movable rod in said supporting member, means operated by movement of the rod in one direction for clamping the tool holder to the saddle in cutting position prior to each cutting operation and by movement in the opposite direction for releasing the tool holder and pivoting the same outwardly, and means for reciprocating the rod in timed relation to the cutting operations.

15. In a machine tool, the combination of a tool supporting member, a tool holder pivotally carried by the member, means for intermittently feeding the member, a movably mounted rod in said supporting member, means operated by the rod for clamping the said member and tool holder together against vibration after each feeding operation and for releasing such members and pivoting the tool holder outwardly after each cutting operation and prior to the feeding operation, and means for operating the rod in timed relation to the feeding operation.

16. In a machine tool, the combination of a support, a saddle slidably mounted thereon, a slide movable in the saddle, means for intermittently feeding the saddle along the support and the slide in the saddle, and means acting in timed relation to the feeding means for clamping the saddle to the support and the slide in the saddle after each feeding operation and for releasing such members prior to each feeding operation.

17. In a machine tool, the combination of a cross rail, a saddle slidably mounted thereon, a slide movable in the saddle, a tool holder mounted on the slide, means for intermittently feeding the saddle along the rail and the slide in the saddle, taper gibs carried by the saddle, and means acting in timed relation to the feeding means for sliding the gibs to rigidly secure the saddle to the rail and the slide in the saddle after each feeding operation and for releasing such members prior to each feeding operation.

18. In a machine tool, the combination of a support, a saddle slidably mounted thereon, a slide movable in the saddle, a tool holder pivotally mounted on the slide, means for intermittently feeding the saddle along the support and the slide in the saddle, and means acting in timed relation to the feeding means for clamping the saddle to the support and the slide and tool holder to the saddle after each feeding operation and for releasing such elements prior to each feeding operation.

19. In a machine tool, the combination of a cross rail, a saddle slidably mounted thereon, a slide movable in the saddle, a tool holder pivotally mounted on the slide, means for intermittently feeding the saddle along the rail and the slide in the saddle, taper gibs carried by the saddle and slide, and means acting in timed relation to the feeding means for sliding the gibs to rigidly secure the saddle to the rail, and the slide and tool holder to the saddle after each feeding operation and for releasing such elements prior to each feeding operation.

20. In a machine tool, the combination of a support, a saddle slidably mounted thereon, a slide movable in the saddle, means for intermittently feeding the saddle along the support and the slide in the saddle, and means acting in timed relation to the feeding means for clamping the saddle to the support and the slide in the saddle after each feeding operation and for releasing such members prior to each feeding operation, the last said means including mechanism for performing the said clamping operations with balanced forces.

21. In a machine tool, the combination of a support, a saddle slidably mounted thereon, a slide movable in the saddle, a tool holder pivotally mounted on the slide, means for intermittently feeding the saddle along the support and the slide in the saddle, and means acting in timed relation to the feeding means for clamping the saddle to its support, and the slide and tool holder to the saddle after each feeding operation and for releasing such elements prior to each feeding operation, the last said means including mechanism for performing the said clamping operations with balanced forces.

22. In a machine tool, the combination of a support, a pair of saddles slidably mounted thereon, means for intermittently feeding the saddles along the support, and means acting in timed relation to the feeding means for clamping the saddles to the support after each feeding operation and for releasing the saddles therefrom prior to each feeding operation, the last said means including mechanism for performing the said clamping operations with balanced forces.

23. In a machine tool, the combination of a support, a pair of saddles slidably mounted thereon, a slide movable in each saddle, means for intermittently feeding the slides in the saddles, and means acting in timed relation to the feeding means for clamping the slides in the saddles after each feeding operation and for releasing the slides therefrom prior to each feeding operation, the last said means including mechanism for performing the said clamping operations with balanced forces.

24. In a machine tool, the combination of a support, a pair of saddles slidably mounted thereon, a slide movable in each saddle, a tool holder pivotally mounted on each slide, and means for clamping the tool holders respectively to their saddles in cutting position prior to each cutting operation, the last said means including mechanism for performing the said clamping operations with balanced forces.

25. In a machine tool, the combination of a support, a pair of saddles slidably mounted thereon, a slide carried by each saddle, means for intermittently feeding the saddles, and means acting in timed relation to the feeding means for clamping the saddles to the support, and the slides respectively to their saddles after each feeding operation and for releasing the same prior to such operation, the last said means including mechanism for performing all the said clamping operations with balanced forces.

26. In a machine tool, the combination of a cross rail, a pair of saddles slidably mounted thereon, means for intermittently feeding the saddles along the rail, means on each saddle for securing the same rigidly to the rail, shafting extending along the rail and operatively connected to the last named means, and means for operating the shafting in timed relation to the feeding means for clamping and unclamping the saddles to and from the rail, the last said means including differential mechanism for operating the two saddle securing means with balanced forces.

27. In a machine tool, the combination of a cross rail, a pair of saddles slidably mounted thereon, a slide carried by each saddle, means for intermittently feeding the saddles, means on each saddle for clamping and unclamping the saddles to the rail and the slides respectively to their saddles, a driver on the rail, means including a telescopic shaft connecting each clamping means with the driver, and mechanism whereby the driver is operated in timed relation to the feeding means for performing the clamping and unclamping operations, the clamp operating means including differential mechanism for operating the clamping means with balanced forces.

28. In a machine tool, the combination of a cross rail, a pair of saddles slidably mounted thereon, means for intermittently feeding the saddles along the rail, a sliding taper gib carried by each saddle, and means acting in timed relation to the feeding means for sliding the gibs with balanced forces to rigidly secure the saddles to the rail after each feeding operation and for releasing the saddles therefrom prior to each feeding operation.

29. In a machine tool, the combination of a cross rail, a pair of saddles slidably mounted thereon, a slide movably carried by each saddle, means for intermittently feeding the tools, means including a taper gib carried by each saddle for rigidly securing the saddles to the rail, and the slides respectively to their saddles in tooling position, and means acting in timed relation to the feeding means for sliding the gibs to clamp the saddles and slides after each feeding operation and for releasing the same prior to such operation, the last said means including mechanism for performing all the said clamping operations with balanced forces.

30. In a tool feeding mechanism for a machine tool, the combination of a support, a tool carrying member slidably mounted on a guideway thereon, means to effect periodic movements of said member, an adjustable taper gib for accurately adjusting the member on the guideway, a clamping gib for clamping the member to the support, and means for automatically sliding the clamping gib into and out of its clamping position between movements of said member.

31. In a tool feeding mechanism for a machine tool, the combination of a support, a tool carrying member slidably mounted on a guideway thereon, an adjustable taper gib for accurately adjusting the member on the guideway, means for periodically moving the member along the guideway, a clamping gib for clamping the member to the support, and means operated by the first mentioned means for sliding the clamping gib into and out of its clamping position between movements of said member.

32. In a tool feeding mechanism for a machine tool, the combination of a support, a tool carrying member slidably mounted on a guideway thereon, means to effect periodic movements of said member, an adjustable taper gib for accurately adjusting the member on the guideway, a taper clamping gib adjacent the adjusting gib for clamping the member to the support, and means for automatically sliding the clamping gib into and out of its clamping position between movements of said member.

33. In a feeding mechanism for a machine tool, the combination of a support, a tool carrying member slidably mounted on a guideway thereon, means to effect periodic movements of said member, an adjustable taper gib for accurately adjusting the member on the guideway, a clamping gib within the adjusting gib for clamping the member to the support, and means for automatically sliding the clamping gib into and out of its clamping position between movements of said member.

In testimony whereof, we hereto affix our signatures.

CLIFFORD F. RANDOLPH.
ROSWELL H. RAUSCH.
NICHOLAS MARCALUS.